(No Model.) 2 Sheets—Sheet 1.
R. A. LAMBERT.
COMBINED SEED PLANTER AND FERTILIZER DISTRIBUTER.
No. 318,753. Patented May 26, 1885.
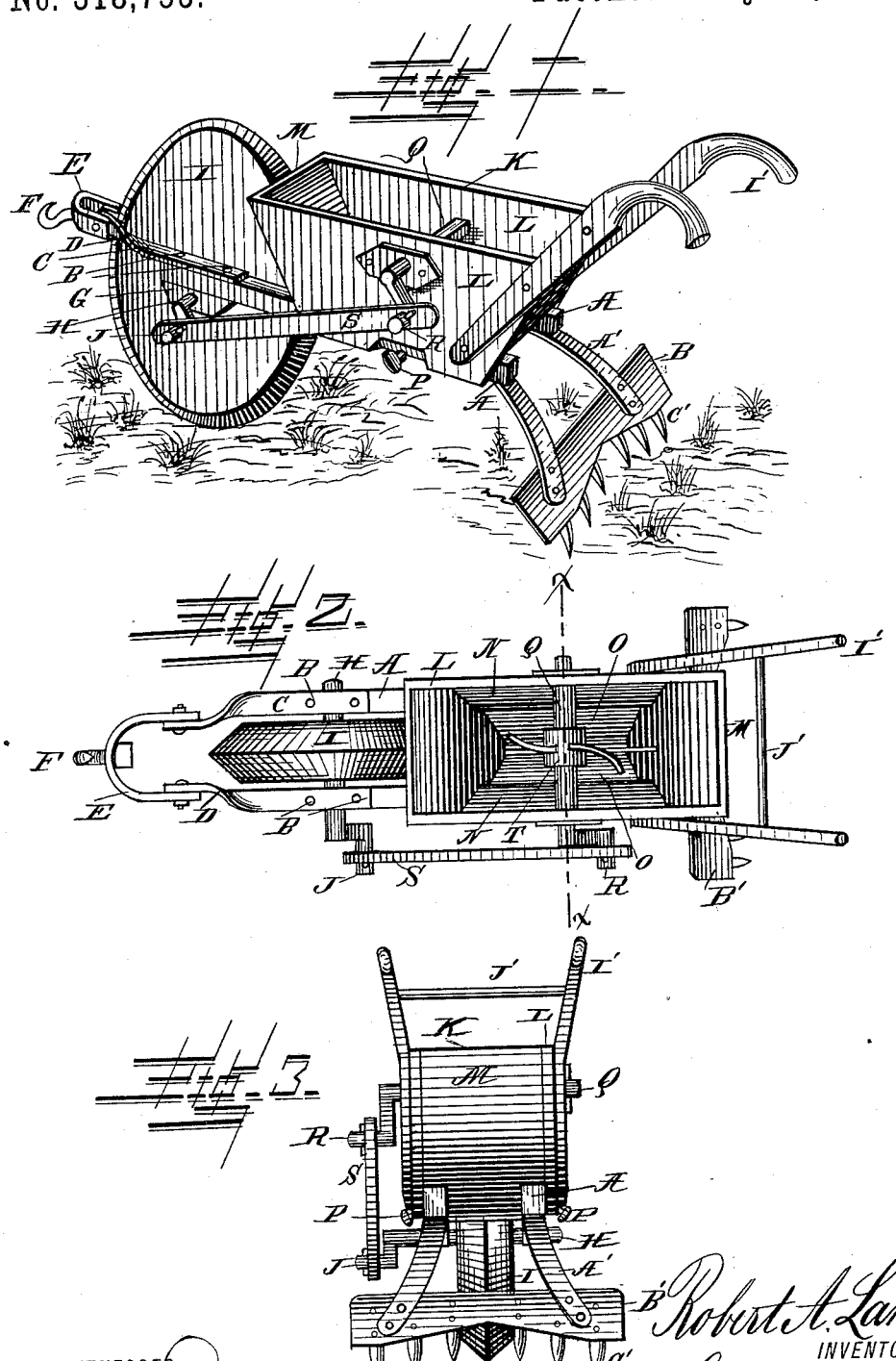

(No Model.) 2 Sheets—Sheet 2.
R. A. LAMBERT.
COMBINED SEED PLANTER AND FERTILIZER DISTRIBUTER.
No. 318,753. Patented May 26, 1885.
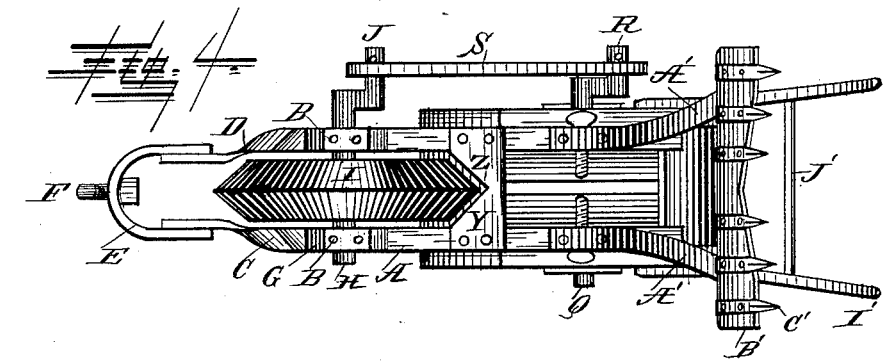
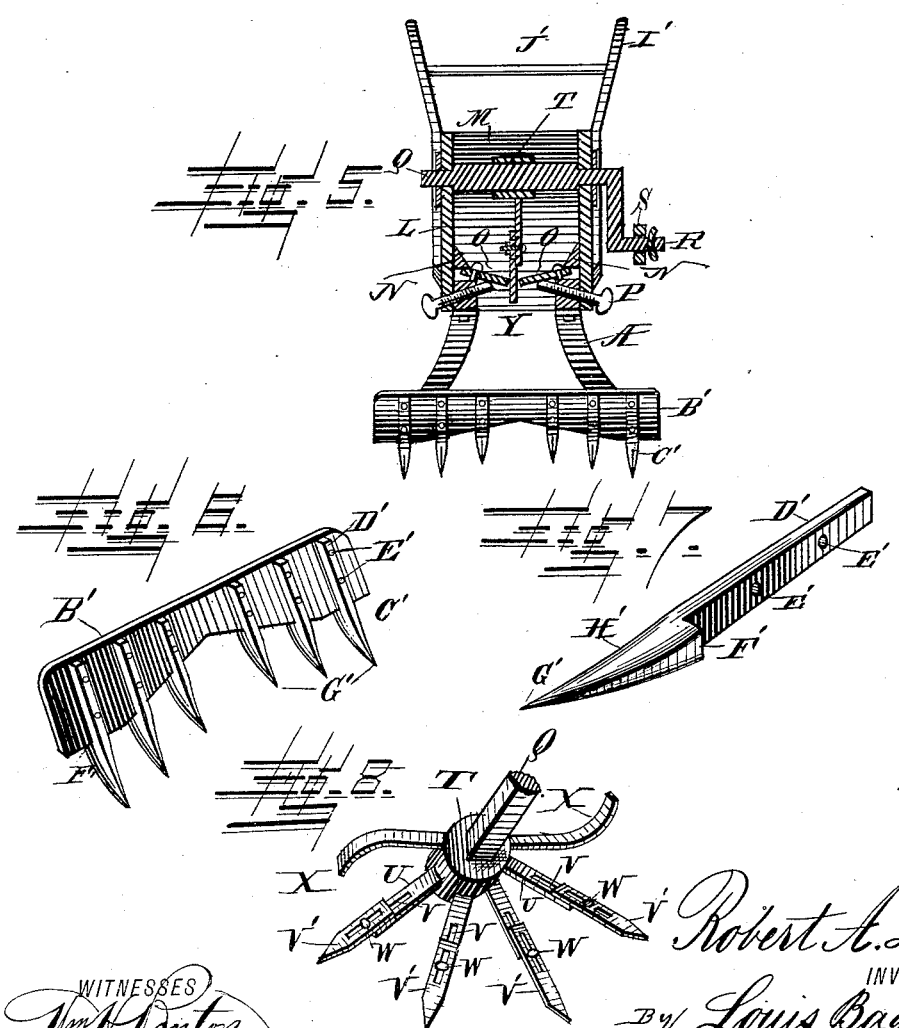

UNITED STATES PATENT OFFICE.

ROBERT A. LAMBERT, OF MOBILE, ALABAMA.

COMBINED SEED-PLANTER AND FERTILIZER-DISTRIBUTER.

SPECIFICATION forming part of Letters Patent No. 318,753, dated May 26, 1885.

Application filed February 9, 1885. (No model.)

*To all whom it may concern:*

Be it known that I, ROBERT A. LAMBERT, a citizen of the United States, and a resident of Mobile, in the county of Mobile and State of Alabama, have invented certain new and useful Improvements in Combined Seed-Planter and Fertilizer-Distributer; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved combined seed-planter and fertilizer-distributer. Fig. 2 is a top view of the same. Fig. 3 is a rear view. Fig. 4 is a bottom view. Fig. 5 is a transverse vertical sectional view taken through the line $x\ x$ in Fig. 2 and looking toward the rear of the machine. Fig. 6 is a perspective detail view of the covering-board, with the teeth of the same in position. Fig. 7 is a detail perspective view of one of the teeth of said covering-board detached, and Fig. 8 is a detail perspective view of the feeding and agitating device.

The same letters refer to the same parts in all the figures.

This invention relates to combined seed-planters and fertilizer-distributers; and it has for its object to provide a device of this class which shall possess superior advantages in point of simplicity, durability, and general efficiency.

With these ends in view the invention consists in the improved construction and arrangement of parts, which will be hereinafter fully described, and particularly pointed out in the claim.

In the drawings hereto annexed, A A designate a pair of longitudinal parallel beams, which form the frame of the machine. Secured to the front ends of the said beams by means of vertical bolts B B are a pair of plates, C C, the front ends of which are twisted to a vertical position, as at D. To the front ends of these plates is hinged a clevis, E, the front end of which is provided with a swiveled hook, F, for the attachment of the draft.

The bolts B B, which serve for the attachment of the clevis-plates C C, also serve to secure to the under sides of the beams A A the boxes G G, which form bearings for a transverse shaft or axle, H, carrying the drive-wheel I. The latter is provided with a V-shaped edge, which, in previously-prepared soil, will form or indent a furrow for the reception of the seed or fertilizing material. Said wheel is made of as large a diameter as possible for the double purpose of insuring lightness of draft and of raising the crank J, which is formed at one end of the axle, to such a height that its operation shall not be interfered with by clods or by inequalities in the soil.

K designates the hopper, which is mounted upon the rear ends of the beams A A. Said hopper consists of perpendicular sides L L and ends M M, which converge from the upper toward the lower end.

Inside the hopper, at the sides of the same, are secured beveled blocks N N, which guide the contents of the hopper toward the center and prevent clogging.

The bottom of the hopper is formed by a pair of doors or plates, O O, hinged to the upper sides of the beams A A, between the latter and the beveled blocks N N. These doors may be adjusted by means of thumb-screw P P, inserted diagonally and transversely in the beams A A, so as to bear against the under sides of the doors O O, midway between their ends and near their inner edges. It will be seen that by withdrawing these set-screws the doors will swing open to an extent regulated by the distance to which the screws are withdrawn, while by turning the screws in the doors will be closed or their inner edges moved toward each other, thereby regulating the size of the slit or feed-opening between the inner edges of the said doors. This adjustment may be made whether the hopper is full or empty, and by it the feed-opening may be adjusted to suit various kinds of seeds and fertilizing material, and to regulate the quantity of either to be dropped.

The sides of the hopper are provided with bearings for a transverse shaft, Q, one end of which is provided with a crank, R, of somewhat larger stroke than the crank J of axle H, with which it is connected by a pitman, S, so that when the axle revolves an oscillating motion will be imparted to the shaft Q. Suitably secured upon the latter, by means of a set-screw or otherwise, is a hub, T, having a series of downward-extending radial fingers, U U, provided with slots V, to which similarly-slotted extension-fingers V' V' are adjustably secured by means of set-screws W. Said fingers should extend slightly through the feed slot or opening, and it will be seen that they may be adjusted so as to extend as far as may be desired. Two of the teeth, which may be the end teeth of the hub or the first and last of the series, are somewhat shorter than the rest, not slotted, and bent, as shown, in opposite directions. These teeth, which are designated by letters X X, serve in operation to force the contents of the hopper downward in the same, while the straight teeth act more particularly to drive it out through the feed-opening.

The beams A A are connected directly in rear of the drive-wheel by a transverse plate, Y, secured to their under sides. This plate, one of whose functions is to act as a brace, is provided with a V-shaped notch, Z, corresponding in shape to the edge of the drive-wheel, and serving in clayey or adhesive soil to clean the said drive-wheel during operation.

Secured about midway under the beams A A are a pair of springs, A' A', which are curved downwardly and rearwardly, and to the lower ends of which is secured the covering-board B', the lower edge of which is of concave shape, so as to fill a trench and leave the covering with an oval shape. The holding-springs are curved in such a manner that the covering-boards shall slope back just enough to prevent trash and surplus dirt from being caught by it and dragged by the machine. Where the land is rough or crusty, or where there is a cropping out of young grass or weeds which it is desired to get rid of without loss of time in planting, the lower edge of the covering-board is provided with a series of teeth, C', of the construction clearly shown in Fig. 7 of the drawings. Said teeth, which are secured detachably, by bolts or otherwise, to the under side of the covering-board, consist of a flat shank, D', having perforations E', to receive the attaching devices, and formed with a shoulder, F', abutting against the lower edge of the covering-board, and tapering below the shoulder to a point, G'. The front side of the tooth proper, or the portion below the shoulder of the shank, forms a sharp edge, H', which will effectually cut and pulverize the soil. The covering device is so proportioned and arranged that the beams A A shall be in about a horizontal position when the machine is at work. It is obvious that the teeth may be readily detached from the covering-board when they are not required to be used.

Handles I' I', by means of which the machine may be guided when at work, are secured to the sides of the hopper and connected in the usual manner by a round, J'.

From the foregoing description, taken in connection with the drawings hereto annexed, the operation and advantages of this invention will be readily understood. The construction is simple and inexpensive, the draft is light, the feed is certain and easily regulated, and the machine may be easily managed with most satisfactory results.

I am aware that seeding-machines have been made with hinged and adjustable doors at the feed-opening, and I am also aware that teeth have been secured to an oscillating shaft in the seed-box of a planter; that laterally-curved feeder-arms have been used in seed-planters, and that cotton-choppers and similar cultivators have been made with longitudinally-adjustable chopping-arms, and I do not wish to claim such constructions; but I am not aware that the feeder-arms in a seed-planter have been made longitudinally adjustable; and I therefore claim—

In a seeding-machine, the combination, with a seed-hopper having a longitudinal feed-aperture in its bottom, of a transverse oscillating shaft, a series of teeth, U, radiating from the under side of the shaft and having longitudinal slots V, and longitudinally-slotted extension-fingers V', sliding adjustably with set-screws W in their slots in the slots of the aforesaid fingers, as and for the purpose shown and set forth.

In testimony that I claim the foregoing as my own I have hereunto affixed my signature in presence of two witnesses.

ROBERT A. LAMBERT.

Witnesses:
M. G. HUDSON,
B. Z. CHADECK.